United States Patent [19]

Slater

[11] Patent Number: 5,285,909
[45] Date of Patent: Feb. 15, 1994

[54] PALLET STORAGE RACK

[76] Inventor: Robert C. Slater, 854 Spring Cove, Schaumburg, Ill. 60193

[21] Appl. No.: 13,043

[22] Filed: Feb. 4, 1993

[51] Int. Cl.$^5$ ................................................. A47F 5/00
[52] U.S. Cl. .................................. 211/151; 211/59.2; 414/276
[58] Field of Search ..................... 211/151, 59.2, 162; 414/276, 376

[56] References Cited

U.S. PATENT DOCUMENTS

| | | | |
|---|---|---|---|
| 2,950,014 | 8/1960 | Sullivan | 211/151 |
| 4,227,466 | 10/1980 | Rooklyn | 211/151 X |
| 4,715,765 | 12/1987 | Aquoff | 211/151 X |
| 4,988,251 | 1/1991 | Kinney | 211/151 X |
| 5,178,288 | 1/1993 | Werer et al. | 211/151 |
| 5,180,069 | 1/1993 | Krummell et al. | 211/151 |
| 5,203,464 | 4/1993 | Allen | 211/151 |

OTHER PUBLICATIONS

Interlake Bulletin FB105 10m/590-ML copyright 1989.
Interlake Bulletin FB030 GP10m-11/91 copyright 1991.

*Primary Examiner*—Robert W. Gibson, Jr.
*Attorney, Agent, or Firm*—Andrew J. Bootz

[57] ABSTRACT

A push-back storage rack is provided for the storage of pallets. The storage rack includes a frame having at least one pair of spaced apart roller track assemblies, each being formed of a pair of two transversely spaced, longitudinal arrays of rollers to form a guide space between the rollers. At least one glide tube or pallet carrier truck rides on the rollers. Each glide tube is formed of a pair of transversely spaced frame members, each frame member having a lower rail portion riding on the rollers of one of the roller tracks. A guide is formed on the rail portions, and the guide extends into the guide space between the transversely spaced array of rollers. The track assemblies are inclined forwardly and downwardly toward the front of the storage rack, so that pallets may be loaded by pushing a first pallet backward on the glide tube, and the pallet on the glide tube will flow toward the front of the storage rack when the pallet in front of it is removed. The storage rack may be two-deep with a single glide tube; or the storage rack may be three or more deep with two or more telescoping glide tubes. Moreover, the storage rack may be stacked vertically into a storage rack assembly.

5 Claims, 5 Drawing Sheets

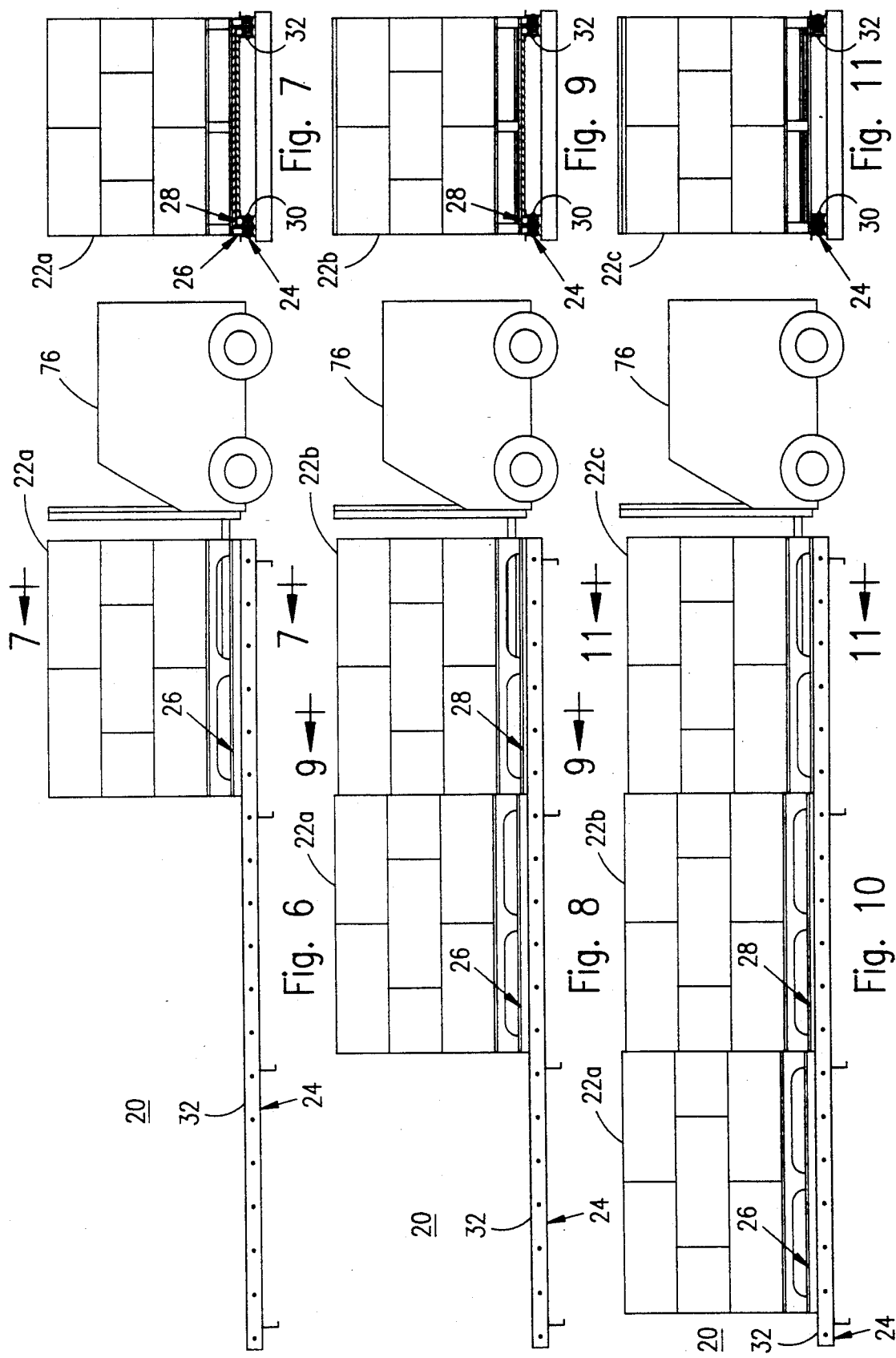

PALLET STORAGE RACK

The present invention relates to storage racks for pallets and the like, and more particularly to storage racks which facilitate storage and retrieval pallets two or more deep in a pallet storage area.

BACKGROUND OF THE INVENTION

Historically pallets have been stored in drive-in racks or storage space wherein a lift truck operator drives the pallet into place and sets it down. Pallets may be set in vertically stacked pallet racks, but due to the limitation in the length of reach of the fork truck fingers, it is difficult to stack the pallets more than one or two deep on the upper pallet levels.

Storage and retrieval of the pallets is slow and awkward in such fixed pallet storage areas, due in part to the difficulty of maneuvering the fork lift truck in the generally narrow aisleways and in the pallet storage bin area.

Push back pallet storage racks are known wherein the lift truck may simply deposit the first pallet in the bin on a suitable pallet carrier, and a second or subsequent pallet in the same row can be placed in the bin by pushing the first pallet toward the rear of the bin. Such push-back storage racks may replace the commonly used drive in rack, to provide an increase in productivity and selectivity in storage.

Known push back systems commonly are difficult to guide the pallets backward on the rack, and generally have a high profile, reducing vertical storage space.

SUMMARY OF THE INVENTION

In accordance with the present invention, there is provided an improved push-back pallet storage rack. The pallet storage may provide for two-deep, three-deep, four-deep, or any desired depth of pallet storage on the storage rack.

In a typical two-deep storage rack, the rack includes a fixed roller frame carrying the rollers; and specifically is defined by a pair of spaced apart roller track assemblies. Each roller track assembly in the pair is formed by two transversely spaced, longitudinal arrays of rollers defining a roller track with a guide space between the array of rollers.

A glide tube or pallet carrier truck rides on a plurality of the rollers; the glide tube is formed of a pair of transversely spaced frame members, each having a lower rail portion riding on the rollers of one of the roller tracks. Guide projections are formed on the rail portions, and fit between the spaced arrays of rollers, thereby providing a positive guide system for the glide tube upon the rollers.

In a preferred embodiment, the upper rim or thread of the roller wheels is recessed or depressed below the upper edge of the roller supporting members, and the upper frame of the glide tube also extends below the upper edge of this roller supporting member, so that the roller supporting member functions as a guide rail further providing a positive guide system for the glide tube.

The roller track assemblies in the roller frame are inclined forwardly and downwardly toward the front of the storage rack, whereby the glide tube tends to flow by gravity toward the front of the pallet rack.

In the embodiments of the invention having three or more deep pallet storage, there is provided a plurality of pairs of spaced apart roller track assemblies in juxtapositioned relation to define at least inner and outer roller track assemblies. There is also provided a glide tube riding on each of the pairs of roller track assemblies. Each of the glide tubes is similar to the glide tube heretofore described in that each has a lower rail portion riding on the rollers of its associated roller track, and guide means project downwardly from the rail portions, fitted between the spaced apart rollers of the roller track assembly to provide positive guide for the glide tube.

The glide tubes are telescopically related so that the outermost glide tubes will nest over the inner glide tubes when the glide tubes are in a forward position. Moreover, due to the forward and downward inclination of the roller track assemblies, the glide tubes will all tend to flow forward under the flow of gravity, but may be pushed back by a lift truck as successive pallets are loaded.

In operation, when it is desired to place a pallet on the storage rack, the lift truck places the pallet on the outer glide tube. When the lift truck brings a second pallet, the lift truck pushes the outer glide tube with its pallet backward into the rack area, and then places the second pallet on the inner glide tube. And finally, when the lift truck brings a third pallet, the lift truck pushes both the outer and inner glide tubes backward, and sets its third pallet down directly on the frame of the pallet rack. The process is reversed to remove the pallets. As each pallet is removed, the remaining pallets flow forward by gravity to the front of the pallet storage rack, where they may be easily picked up by the lift truck.

Advantageously the push-back system according to the present invention has a very low profile, providing for maximum utilization of the vertical space in the storage area, and allowing for the maximum number of vertically stacked racks in the storage.

The arrangement of the rollers in the fixed frame member allows for construction of pallet racks of different capacities simply by the selected spacing of the rollers.

Two positive guide systems are built into the storage rack, the first resulting from the vertical interference or overlap between the upper edge of the roller supporting members with the frame of the glide tube; and additionally by the building in of the guide projection on the lower rail surface of the glide tubes which is fitted into the guide space between the pairs of rollers. Advantageously there is thereby provided a positive guide system for the glide tubes.

Other advantages and benefits of the improved push-back storage rack will become apparent from the following description of the drawings and detailed description of the invention.

BRIEF DESCRIPTION OF THE DRAWINGS

FIG. 6 is an elevational view of the storage rack of FIG. 1 showing the placement of a first pallet upon the storage rack.

FIG. 7 is a sectional view of the storage rack of FIG. 6 taken along line 7—7 of FIG. 6.

FIG. 8 is an elevational view of the storage rack of FIG. 1 showing the placement of a second pallet upon the storage rack.

FIG. 9 is a sectional view of the storage rack of FIG. 8, taken along line 9—9 of FIG. 8.

FIG. 10 is an elevational view of the storage rack of FIG. 1 showing the placement of a third pallet upon the storage rack.

FIG. 11 is a sectional view of the storage rack of FIG. 10, taken along line 11—11 of FIG. 10.

DETAILED DESCRIPTION OF THE EMBODIMENT OF FIGS. 1 THRU 11

Figure 1:
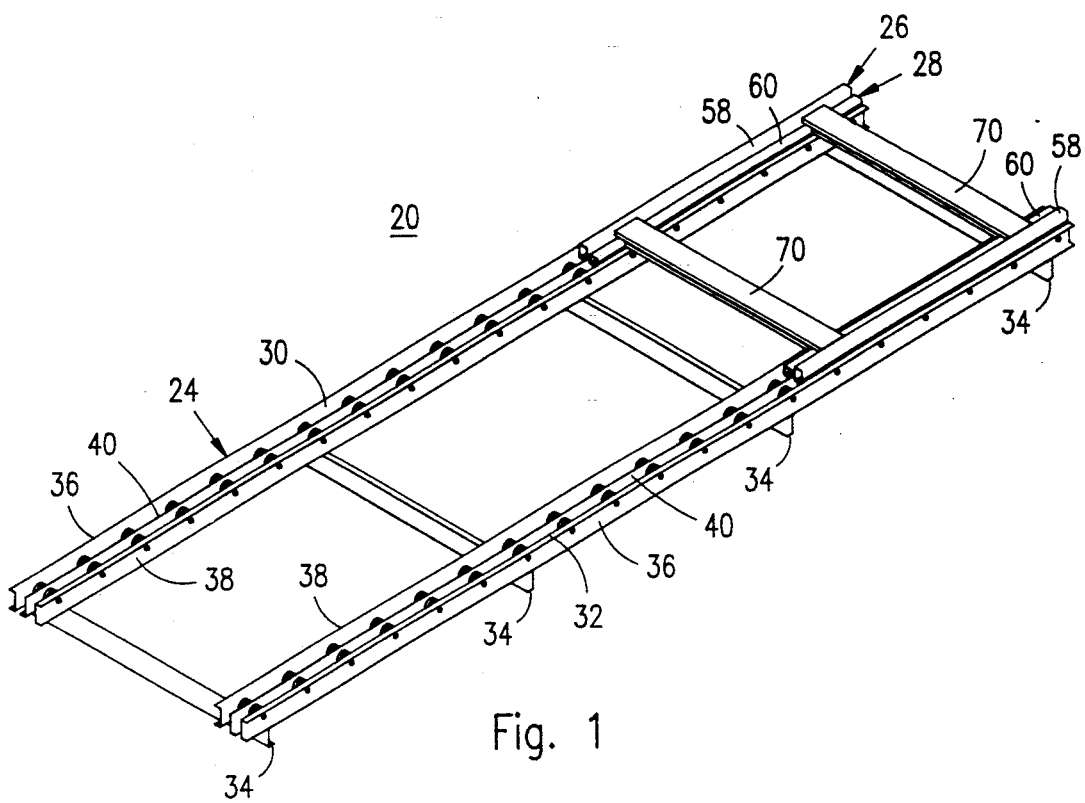
FIG. 1 is a perspective view of a storage rack according to an embodiment of the present invention and having a three deep pallet storage.
Figure 2:
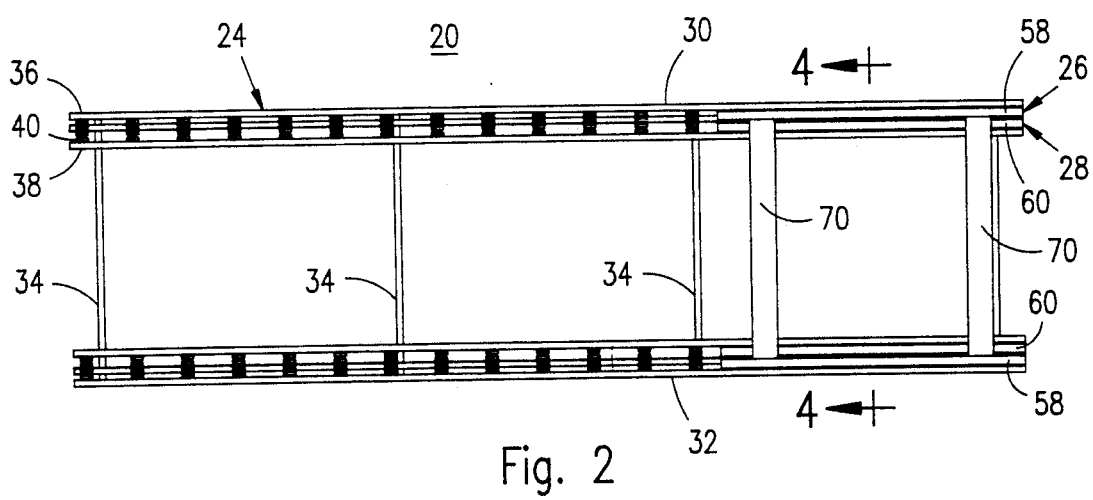
FIG. 2 is a plan view of the storage rack according to the embodiment of FIG. 1.
Figure 3:
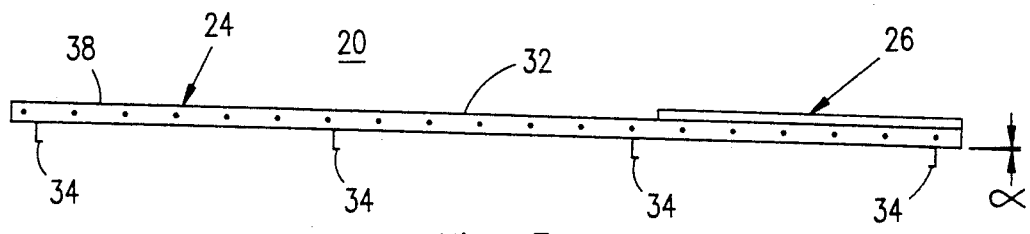
FIG. 3 is an elevational view of the storage rack of the embodiment of FIG. 1.

Referring now to the drawings, and specifically to the embodiment of FIGS. 1 through 11, there is shown an improved pallet storage rack 20 for storing and retrieving pallets, 22a, 22b, 22c, FIGS. 6 through 11, three deep, according to the present invention. The storage rack 20 includes a roller frame 24 and one or more glide tubes of pallet carrier trucks, here shown as two in number, 26 and 28, so as to accommodate the three pallets 22a, 22b, 22c. The glide tubes move telescopically so that the inner one 28, FIGS. 1 and 2, stores within the outer one 26 when there are no pallets, or when there is one pallet, on the storage rack 20.

Referring now to the storage rack 20, it is formed in the illustrated embodiment by transversely spaced parallel rail assemblies 30, 32 defining juxtapositioned inner and outer pairs of roller track assemblies, and held together by suitable support beams, 34, here shown as channel members. The rail assemblies 30, 32 are mounted on the support beams 34 with a slight downward and forward inclination, angle $\alpha$, FIG. 3, so that the glide tubes and pallets will flow forward by gravity when the pallets are removed. In the illustrated embodiment, the angle $\alpha$ is approximately 3°. Each rail assembly is formed of a pair of side members 36, 38 and a center member 40, best shown in FIG. 5. The side members 36, 38 in the illustrated embodiment are channel members, each having a vertical web 36a, 38a, a lower horizontal leg 36b, 38b, and an upper horizontal leg 36c, 38c. The horizontal legs 36b, 36c on the outer side members 36 extend outwardly, while the horizontal legs 38b, 38c on the inner side members 38 extend inwardly. The center member 50 has a vertical web 40a and a lower horizontal leg 40b. The vertical webs 36a, 40a, and 38a are spaced apart to define a roller track.

Spaced between each set of vertical webs 36a, 40a and 40a, 38a is a double row or longitudinal array of regularly spaced rollers 44 defining the roller track. Each roller 44 includes a roller wheel 46 journalled on a spindle so as to be freely rotatable thereon. Thus there is formed roller tracks each defined by two transversely spaced, longitudinal array of spaced apart rollers. The spindles 48 on the rollers 46 are provided with axially extending apertures (not shown) and the vertical webs 36a, 40a, 38a have apertures (not shown) aligned with the apertures in the spindles 48 so that a bolt 52 extends through the aligned apertures of the vertical webs 36a, 40a, 38a and the aligned apertures of the roller spindles thereby securing the rail assemblies 30, 32 together.

Each roller 44 has a generally axially extending outer rim or thread 44a to provide a roller track having an extended bearing surface for the glide tubes 26, 28. Moreover the roller wheels 46 of each transverse pair of rollers are held in spaced apart relation by the extensions of their spindles, so as to form a guide space for the glide tubes 26, 28. The rollers 44 are mounted in such a position on the vertical webs 36a, 40a, 38a that the outer rim or thread 44a of each roller 44 is recessed or depressed below the upper edge of the vertical webs 36a, 40a, 38a further forming a guide track for the glide tubes 26, 28.

Figure 4:
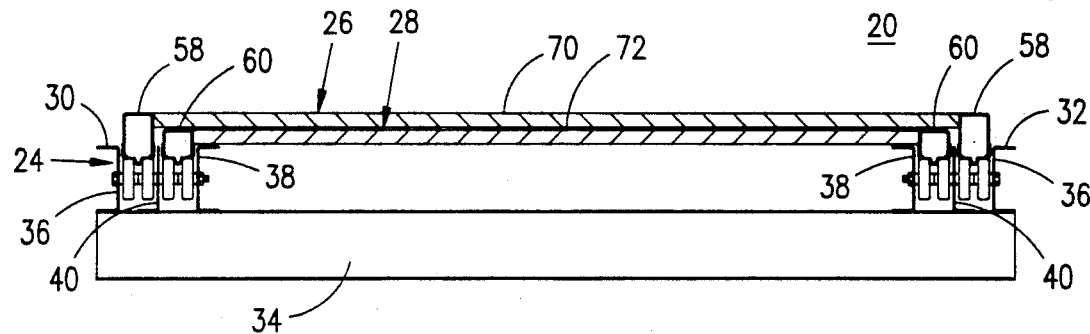
FIG. 4 is a sectional view of the storage rack of the embodiment of FIG. 1 taken along line 4—4 of FIG. 2, and drawn to a larger scale.
Figure 5:
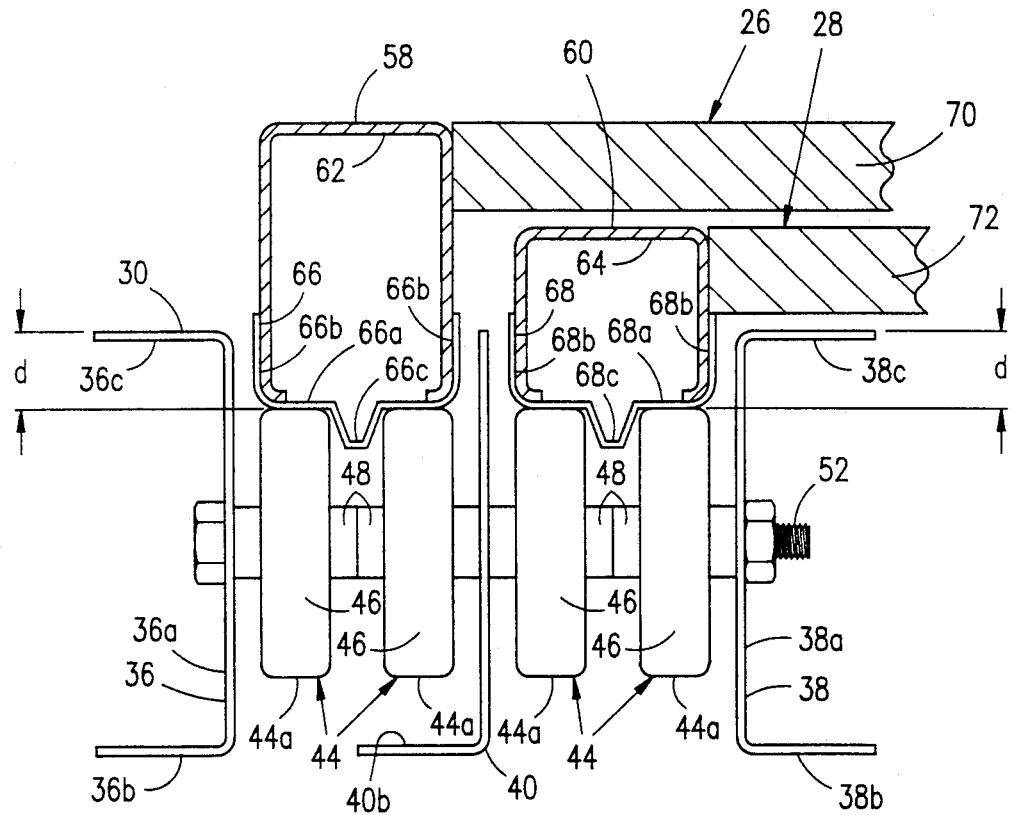
FIG. 5 is an enlarged fragmentary sectional view of the rail and glide tube assembly of the storage rack of FIG. 1, also taken along line 4—4 of FIG. 2.

Referring now to the glide tubes 26, 28, best shown in FIGS. 4 and 5, each glide tube 26, 28 includes an outer frame assembly 58, 60, each of general box shape, and each including an inverted, generally C-shaped frame member 62, 64 resting in a generally U-shaped track member 66, 68. Each U-shaped track member 66, 68 has a lower bight portion 66a, 68a defining a rail portion and terminating in vertically upwardly extending leg portions 66b, 68b. The frame members 62, 64 are secured within and between the leg portions 66b, 68b to form an integral box structure. Each track member 66, 68 has a downwardly projecting generally truncated V-shaped guide 66c, 68c in the bight portion 66a, 68a and positioned in the guide space formed between a pair of spaced rollers 44. Each track member 66, 68 rides on a plurality of the rollers 44, with its guide 66c, 68c positioned between the rollers 44. Moreover, the portion of the vertical webs 36a, 40a, 38a which extends upwardly above the upper perimeter of the rollers form a guide rail or track to help align the glide tubes 26, 28. More specifically, the leg portions 66b, 68c extend a distance d, FIG. 5, below the upper edge of the side members 36, 38 and center member 40 to form a guide for the glide tubes 26, 28 and to protect the rollers which are also recessed or depressed below the upper edges of the side members 36, 38 and center member 40. Frame members 70, 72 connect the respective outer frame assemblies 58, 60 to form a unitary glide tube.

The glide tubes 26, 28 telescope relative to each other, and to this end, the lower surface of the frame members 70 vertically clears the upper surfaces of the inner glide tube 28, that is, the C-shaped frame member 62 of the outer glide tube is sufficiently deeper than the C-shaped frame member 64 of the glide tube 28 to allow for telescoping of the glide tubes.

The operation of the improved storage rack is believed clear from the above detailed description, but is more fully illustrated in FIGS. 6 through 11. As therein illustrated, when it is desired to place a pallet 22a upon the storage rack 20, the lift truck 76 places the pallet 22a on the outer glide tube 26. When the lift truck 76 brings the second pallet 22b, the lift truck 76 pushes the outer glide tube 26 backward with the pallet 22b, and then places the second pallet 22b on the inner glide tube 28, FIGS. 8 and 9. And finally when it is desired to place the third pallet 22c on the storage rack 20, the lift truck 76 pushes both of the first two pallets, and both of the glide tubes 26, 28 backward FIGS. 10 and 11, and places the third pallet 22c directly on the roller frame 24.

The process is reversed to remove the pallets. The lift truck 76 will move in and pick up the third pallet 22c and remove it from the storage rack 20. The two remaining pallets 22a and 22b with their respective glide tubes 26, 28 will flow forward by gravity due to the inclination of the roller frame 24 to the horizontal by the angle α. To remove the second pallet 22b the lift truck simply moves in and lifts the pallet 22b off the glide tube 28 and moves away. The first pallet 22a on the glide tube 26 will now flow forward due to gravity as a result of the inclination of the roller frame 24 to the horizontal. The glide tube 26 will telescope over the glide tube 28 so that the first pallet 22a now moves to the front of the storage rack 20. And finally when it is desired to remove the remaining pallet 22a, the lift truck 76 can simply move in and take it away.

DETAILED DESCRIPTION OF FIG. 12

Figure 12:
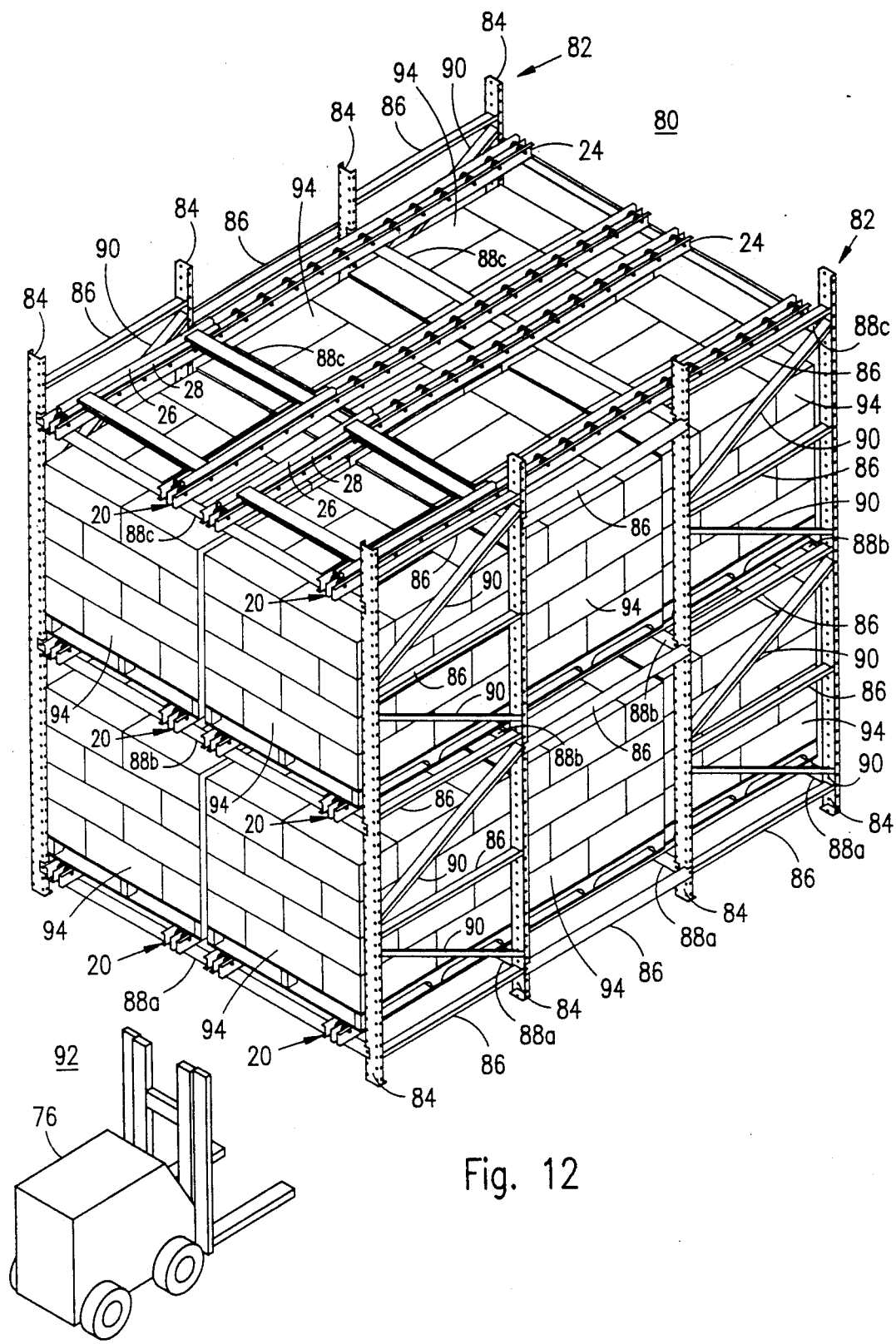
FIG. 12 is a perspective view of a storage rack assembly utilizing the storage racks of FIGS. 1 through 11, vertically stacked for high density storage.

FIG. 12 illustrates an assembly or installation of a plurality of the storage racks 20 assembled or installed in a vertically stacked position to provide maximum utilization of floor space and vertical space of the storage area. As therein illustrated, there is shown a storage rack assembly 80 containing a plurality of vertically stacked or spaced and one or more horizontally spaced rows of the pallet storage racks 20. The storage rack assembly 80 has a frame 82 formed of a plurality of vertical columns 84 interconnected by a plurality of horizontal side beams 86, diagonal struts 90, and three sets of horizontal cross members, a lower set 88a, an intermediate set 88b, and an upper set 88c.

Two pallet storage racks 20 are mounted in side-by-side or horizontally spaced relation on each of the sets 88a, 88b, 88c of the horizontal cross members. Each of the pallet storage racks 20 is identical to the storage pallet rack 20 heretofore described.

As heretofore described, each of the storage racks 20 is mounted with a forward and downward inclination to the horizontal so that the glide tubes or pallet carriers 26, 28 on each storage rack will flow by gravity toward the front or lift truck aisleway 92 for accommodating the lift truck 76.

Various pallets 94 may be placed on the storage racks 20 by the lift truck 76 in the same manner as heretofore described as best shown in FIGS. 6 through 11.

Advantageously the shallow depth or height of the pallet storage rack 20 provides for maximum vertical storage and stacking of the pallet racks 20 to allow for maximum utilization of vertical space in the storage area.

DETAILED DESCRIPTION OF THE EMBODIMENT OF FIGS. 13 THRU 15

Figure 13:
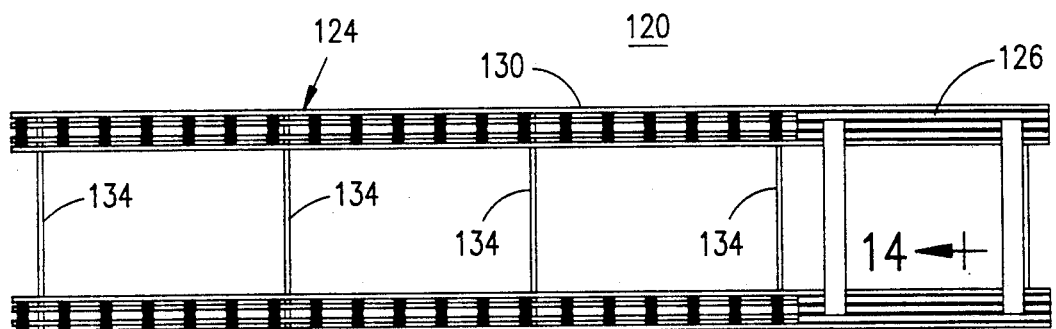
FIG. 13 is a plan view of the improved storage rack according to another embodiment thereof having a four-deep pallet storage.
Figure 15:
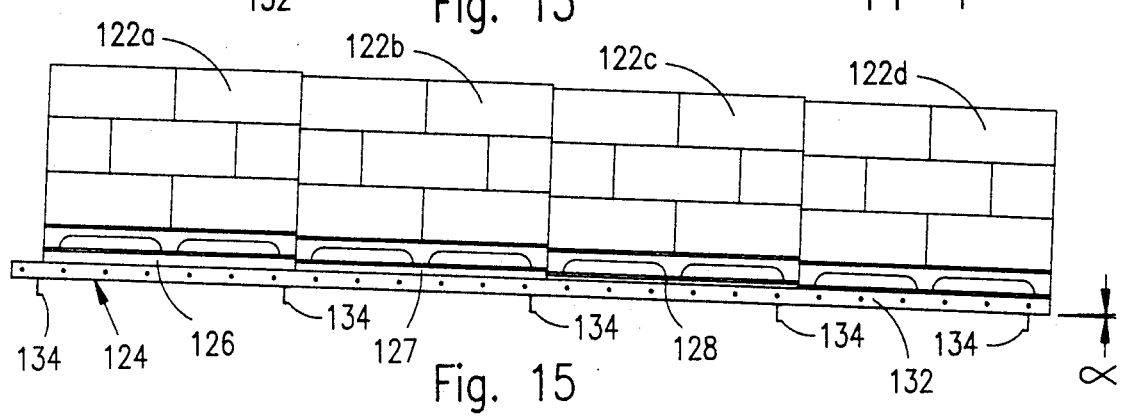
FIG. 15 is an elevational view of the storage rack of FIG. 13 showing the placement of four pallets on the storage rack.
Figure 14:
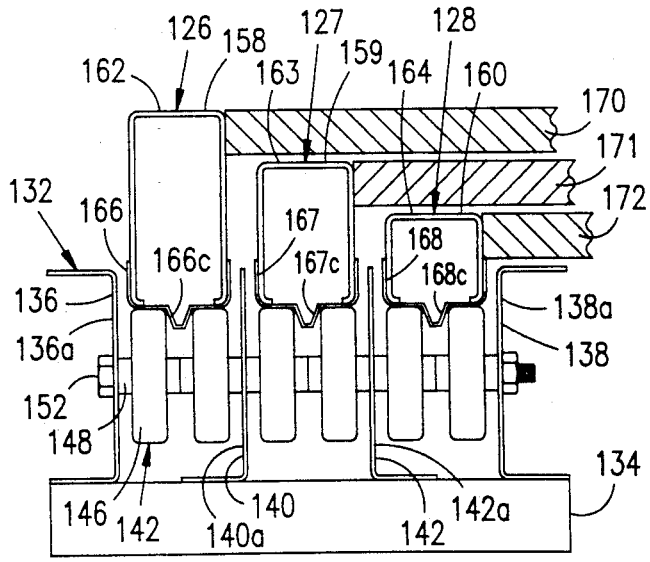
FIG. 14 is a fragmentary elevational sectional view of the storage rack of FIG. 13, taken along line 14—14 of FIG. 13, drawn to a larger scale.

Referring now to the embodiment of FIGS. 13 through 15, there is shown another embodiment of an improved storage rack according to the present invention and adapted for a four-deep pallet storage. More specifically, there is illustrated a pallet storage rack 120 for storing and dispensing pallets 122a, 122b, 122c and 122d. The storage rack includes a roller frame 124 and a plurality of glide tubes or carrier trucks 126, 127, 128. The storage frame 124 is formed by transversely spaced parallel rail assemblies defining a plurality of roller track assemblies and held together by suitable beams 134. The rail assemblies are mounted on the support beams 134 with a slight downward and forward inclination of the storage rack, angle α, FIG. 17, so that the glide tubes 126, 127, 128 will flow forward by gravity.

Each rail assembly is formed of a pair of side members 136, 138 which in the illustrated embodiment are channel members; and a pair of intermediate members 140, 142 which in the illustrated embodiment are angle members. Each side member has a vertical web, 136a, 138a and each intermediate member has a vertical web 140a, 142a. The vertical webs 136a, 140a, 142a, and 138a are spaced apart to define roller tracks.

A double row or longitudinal array of regularly spaced rollers 144 are positioned between the vertical webs 136a, 140a, 142a and 138a defining a roller track formed by the two transversely spaced arrays of rollers. Each roller 144 is identical to the rollers 44 heretofore described, and includes a roller wheel 146 journalled on a spindle 148 so as to rotate freely thereon. The spindles are provided with axially extending apertures and the vertical webs 136a, 140a, 142a, and 138a have apertures aligned with the openings in the spindles, with a bolt 152 extending through the aligned apertures of the vertical web and aligned spindles. Each pair of spaced apart rollers 144 defines a guide space between them.

The rollers 144 are mounted in such a vertical position on the vertical webs 136a, 140a, 142a, 138a that the outer rim or thread of each roller wheel 146 is depressed or recessed below the upper edge of the vertical webs 136a, 140a, 142a and 138a, further forming a guide track for the glide tubes 126, 127, 128.

The glide tubes 126, 127 128 are similar to the glide tubes 26 and 28 heretofore described, and each includes an outer frame assembly 158, 159, 160, each of general box shape, and each including an inverted, generally C-shaped frame member 162, 163, 164 resting in a generally U-shaped track member 166, 167, 168. Each U-shaped track member 166, 167, 168 has a lower bight portion defining a raid portion and terminating in vertically upwardly projecting leg portions. The frame members 162, 163, 164 are secured within and between the leg portions to form the integral box structure. Each track member 166, 167, 168 has a downwardly projecting generally truncated V-shaped guide 166c, 167c, 168c in the bight portion and positioned in the guide space formed between the pair of spaced rollers 144. Each track member 166, 167, 168 rides on a respective pair of rollers 144, with its guide 166c, 167c, 168c positioned between the rollers 144. Moreover, the portion of the vertical webs 136a, 140a, 142a, 138 which extends upwardly above the upper perimeter of the rollers 144 form a guide rail or track to help align the glide tubes 126, 127, 128. Frame members 170, 171, 172 connect the respective outer frame assemblies 158, 159, 160 to form a unitary glide tube.

The glide tubes 126, 127, 128 telescope relative to each other, and to this end, the lower surface of the frame member 170 vertically clears the upper surfaces of the intermediate tube 127, that is, the C-shaped frame member of the outer glide tube 166 is sufficiently deeper than the C-shaped frame members 163, 164 of the glide tubes 127, 128 to allow for telescoping of the glide tubes. Likewise, the lower surface of the frame member 171 vertically clears the upper surfaces of the inner glide tube 128; that is, the C-shaped frame member 163 of the intermediate glide tube 127 is sufficiently deeper than the C-shaped frame member 164 of the inner glide tube 128 to allow for telescoping of the inner glide tube 128 within the intermediate glide tube 127.

The operation of the improved storage rack is believed clear from the above detailed description, and is similar to the operation of the storage rack shown in FIGS. 1 through 11. Briefly, a lift truck can place the first pallet 122a, FIG. 15 on the glide tube 126. When the second pallet 122b is brought into place by the lift truck, the lift truck pushes the first pallet 122a on the outer glide tube 126 rearward, and deposits the second pallet 122b on the intermediate glide tube 127. When the third pallet is brought into place by the lift truck, the lift truck pushes the first and second pallets, on the glide tubes 126, 127 rearward, and deposits the third pallet 122c on the inner glide tube 128. And finally when the fourth pallet 122d is brought into place by the lift truck, the lift truck pushes the first, second and third pallets, each on their glide tubes 126, 127, 128 rearward, and deposits the fourth pallet directly on the roller frame 124.

The process is reversed to remove the pallets. The lift truck will move in and pick up the most forward pallet, that is, the fourth pallet 122d when there are four pallets deep, and the remaining pallets on their glide tubes will flow forward due to gravity. This process is repeated to remove the successive pallets 122c, 122b, and 122a.

DETAILED DESCRIPTION OF THE EMBODIMENT OF FIGS. 16 AND 17

Figure 16:
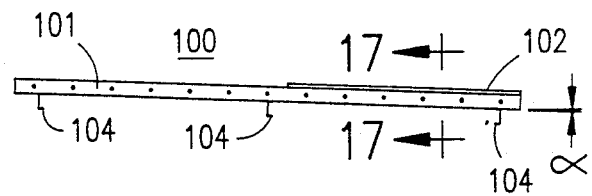
FIG. 16 is an elevational view of a two-deep storage rack according to another embodiment of the present invention.
Figure 17:
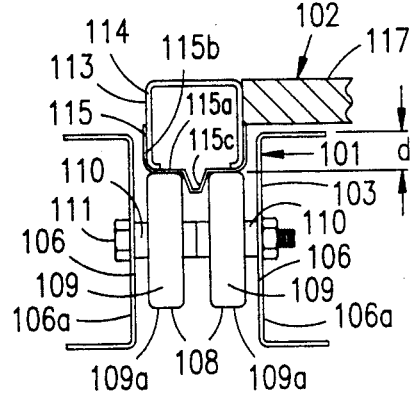
FIG. 17 is an enlarged fragmentary sectional view of the rail and glide assembly of the storage rack of FIG. 16, taken along line 17—17 of FIG. 16.

FIGS. 16 and 17 illustrate a two-deep embodiment of a pallet storage rack 100. The storage rack 100 is formed of a roller frame 101 and a single glide tube or pallet carrier truck 102 so as to accommodate two pallets deep. The pallet storage rack 100 in the illustrated embodiment is formed by a rail assembly 103 defining a pair of spaced apart roller track assemblies, and held together by suitable support beams 104. The rail assembly 103 is mounted on the support beams with a slight downward and forward inclination of the storage rack 100, angle $\alpha$, FIG. 16, so that the glide tube 102 and any pallet thereon will flow forward by gravity. In the illustrated embodiment, the angle $\alpha$ is approximately 3°. Each rail assembly 103 is formed of a pair of side members 106, here shown as channel members, and each having a vertical web 106a. The vertical webs 106a are spaced apart to define a roller track.

Spaced between the vertical webs 106a is a double row or longitudinal array of regularly spaced rollers 108, identical to the rollers 44 heretofore described. Each roller 108 includes a roller wheel 109 journalled on a spindle 110 so as to be freely rotatable thereon. Thus there is formed a roller track defined by two transversely spaced, longitudinal arrays of spaced apart rollers. The spindles on the rollers 108 are provided with axially extending apertures (not shown) and the vertical webs 106a have apertures (not shown) aligned with the apertures of the rollers 108 so that a bolt 110 extends through the apertures of the vertical webs 106a and the aligned apertures of the roller spindles thereby securing the rail assemblies 103 together.

Each roller 108 has a generally axially extending outer rim or thread 109a to provide a roller track having an extended bearing surface for the glide tube 102. Moreover, the roller wheels 109 of each transverse pair of rollers 108 are held in spaced apart relation by the extensions of their spindles, so as to form a guide space for the glide tube 102. The rollers 108 are mounted on the vertical webs 106a so that the outer rim or thread 109a of each roller is depressed or recessed below the upper edge of the vertical webs 106a, forming a further guide for the glide tube 102.

Referring now to the glide tube 102, best fragmentarily shown in FIG. 17, the glide tube 102 is similar to the glide tube 28 heretofore described, and includes an outer frame assembly 113 of general box shape, including an inverted generally C-shaped frame member 114 resting in a generally U-shaped track member 115. The U-shaped track member 115 has a lower bright portion 115a defining a rail portion and terminating in vertically extending leg portions 115b. The frame member 114 is secured within and between the leg portions 115b to form the integral box structure. The track member 115 has a downwardly projecting generally truncated V-shaped guide 115c formed in the bight portion 115a and positioned in the guide space formed between the pair of spaced rollers 108. The track member 115 rides on a plurality of the rollers 108, with its guide portion 115c positioned between the rollers 108. Moreover, the portion of the vertical webs 106a of the side members 106 which extends above the upper perimeter of the rollers forms a guide or track to further align the glide tube 102. More specifically, the leg portions 115b extend a distance d, FIG. 17, below the upper edge of the side member 106 to form a guide surface for the glide tube 102 and to protect the rollers 108 which are also recessed below this upper edge of the side member 106. Frame members 117 connect the respective frame assemblies to form a unitary glide tube.

What is claimed as new and desired to be secured by Letters Patent of the United States is:

1. A storage rack for pallets and the like comprising:
   a) a roller frame defined by at least one pair of spaced apart roller track assemblies, each roller track assembly in said pair being formed by two transversely spaced, longitudinal arrays of rollers defining a roller track with a guide between the arrays of rollers; and
   b) at least one glide tube riding on a plurality of said rollers, said glide tube being formed of a pair of transversely spaced frame members, each frame member having a lower rail portion riding on the rollers of one of said roller tracks, guide means formed on said rail portions guiding said rail portions relative to the rollers of its associated spaced array of rollers, and means interconnecting the pair of transversely spaced frame members;
   said roller frame being inclined downwardly and forwardly so that said glide tube will flow forwardly under the force of gravity.

2. A storage rack for pallets and the like comprising:
   a) a roller frame defined by a plurality of pairs of spaced apart roller track assemblies, each pair of roller track assemblies being juxtapositioned within the adjacent pair of roller track assemblies to define at least an inner and an outer roller track, each of said roller tracks in each of said pairs being formed by two transversely spaced, longitudinal arrays of rollers defining a roller track with a guide space between the rollers, and
   b) a plurality of glide tubes equal in number to the plurality of pairs of spaced apart roller tracks, and each glide tube riding on a respective pair of spaced apart roller tracks, each of said glide tubes being formed of transversely spaced frame members, each frame member having a lower rail portion riding on the rollers of one of said roller tracks, said glide tubes being telescopically arranged whereby the glide tube riding on the outermost track telescopes over the glide tube riding on the inner roller track, means interconnecting the transversely spaced frame members of a respective glide tube, and guide means formed on said rail portions guiding said rail portions relative to the rollers of its associated spaced array of rollers, and said roller frame being inclined downwardly and forwardly so that said glide tubes will flow forwardly under the force of gravity.

3. A storage rack as set forth in claim 2 above wherein said roller frame includes inner, intermediate and outer pairs of spaced apart roller track assemblies, and wherein said plurality of glides tubes includes three in number, one riding respectively on the inner, intermediate, and outer pairs of said spaced apart roller track assemblies.

4. A storage rack as set forth in claim 2 above wherein each of said roller track assemblies is formed of spaced apart vertical web members supporting its respective transversely spaced longitudinal array of rollers, and wherein the upper rim of each roller is vertically depressed below the upper edge of said vertical web member thereby forming a guide track for the respective glide tube.

5. A storage rack as set forth in claim 2 above wherein the lower rail portion of the glide tube is provided with a truncated V-shaped guide projection extending downwardly in the guide space between the arrays of rollers.

* * * * *